(12) United States Patent
Eckart et al.

(10) Patent No.: US 8,209,910 B2
(45) Date of Patent: Jul. 3, 2012

(54) MOTOR VEHICLE DOOR

(75) Inventors: Gerald Eckart, Maierhöfen (DE); Horst Morlok, Weissach (DE)

(73) Assignee: Dr. Ing. h.c.F. Porsche AG (DE)

( * ) Notice: Subject to any disclaimer, the term of this patent is extended or adjusted under 35 U.S.C. 154(b) by 230 days.

(21) Appl. No.: 12/604,498

(22) Filed: Oct. 23, 2009

(65) Prior Publication Data

US 2010/0123336 A1 May 20, 2010

(30) Foreign Application Priority Data

Nov. 19, 2008 (DE) .................. 10 2008 057 995

(51) Int. Cl.
*B60J 1/08* (2006.01)
*B60J 5/04* (2006.01)

(52) U.S. Cl. ...................... 49/502; 296/146.2

(58) Field of Classification Search ............ 49/348, 49/374, 502; 296/146.2
See application file for complete search history.

(56) References Cited

U.S. PATENT DOCUMENTS

| | | | | |
|---|---|---|---|---|
| 3,385,000 A * | 5/1968 | Sturtevant et al. | ............... | 49/440 |
| 3,782,036 A * | 1/1974 | Clark et al. | ............... | 49/502 |
| 4,387,536 A * | 6/1983 | Prato | ............... | 49/502 |
| 4,586,290 A * | 5/1986 | Juechter | ............... | 49/348 |
| 4,648,208 A * | 3/1987 | Baldamus et al. | ............... | 49/502 |
| 4,651,470 A * | 3/1987 | Imura et al. | ............... | 49/502 |
| 4,905,412 A * | 3/1990 | Srock et al. | ............... | 49/352 |
| 4,910,914 A * | 3/1990 | Asoh | ............... | 49/214 |
| 4,924,630 A * | 5/1990 | Lomasney et al. | ............... | 49/502 |
| 4,969,295 A * | 11/1990 | Nishikawa et al. | ............... | 49/502 |
| 5,226,259 A * | 7/1993 | Yamagata et al. | ............... | 49/502 |
| 5,317,835 A * | 6/1994 | Dupuy et al. | ............... | 49/441 |
| 5,555,677 A * | 9/1996 | DeRees et al. | ............... | 49/502 |
| 5,557,890 A * | 9/1996 | Levy et al. | ............... | 49/502 |
| 5,560,152 A * | 10/1996 | Haner | ............... | 49/348 |
| 5,802,769 A * | 9/1998 | Lee | ............... | 49/374 |
| 5,846,463 A * | 12/1998 | Keeney et al. | ............... | 264/135 |
| 5,907,897 A * | 6/1999 | Hisano | ............... | 29/434 |
| 5,964,063 A * | 10/1999 | Hisano et al. | ............... | 49/502 |
| 6,422,639 B1 * | 7/2002 | Hemauer | ............... | 296/146.5 |
| 6,571,513 B2 * | 6/2003 | Maass | ............... | 49/489.1 |
| 6,754,991 B2 * | 6/2004 | Tokui et al. | ............... | 49/502 |
| 7,003,881 B2 * | 2/2006 | Galliani et al. | ............... | 29/897.2 |
| 2006/0156632 A1 * | 7/2006 | Ruppert et al. | ............... | 49/502 |
| 2008/0127569 A1 * | 6/2008 | Boddy et al. | ............... | 49/502 |
| 2008/0252097 A1 * | 10/2008 | Miyamoto et al. | ............... | 296/146.2 |
| 2008/0271379 A1 | 11/2008 | Rietdijik et al. | | |

FOREIGN PATENT DOCUMENTS

DE 3339141 A1 5/1985
DE 3718876 A1 12/1988

(Continued)

OTHER PUBLICATIONS

German Search Report dated Mar. 10, 2009.

*Primary Examiner* — Katherine W Mitchell
*Assistant Examiner* — Justin Rephann
(74) *Attorney, Agent, or Firm* — Gerald E. Hespos; Michael J. Porco

(57) ABSTRACT

A motor vehicle door has a triangular pane, a lowerable side pane, and a guide rail for guiding the lowerable side pane being provided between the triangular pane and the lowerable side pane. Here, the guide rail is fixedly connected to a window frame, to an inner window slot and to a mirror reinforcement.

7 Claims, 3 Drawing Sheets

FOREIGN PATENT DOCUMENTS

| | | |
|---|---|---|
| DE | 19720812 A1 | 12/1998 |
| DE | 19962988 A1 | 5/2000 |
| DE | 10216237 A1 | 10/2003 |
| DE | 10344707 A1 | 4/2005 |
| DE | 202004007053 U1 | 9/2005 |
| JP | 2001097120 A | 4/2001 |

* cited by examiner

MOTOR VEHICLE DOOR

CROSS-REFERENCE TO RELATED APPLICATION

This application claims the priority, under 35 U.S.C. §119 of German application DE 10 2008 057 995.5 filed Nov. 19, 2008; the prior application is herewith incorporated by reference in its entirety.

BACKGROUND OF THE INVENTION

Field of the Invention

The present invention relates to a motor vehicle door having a triangular pane, a lowerable side pane, and a guide rail for guiding the lowerable side pane. The guide rail is provided between the triangular pane and the lowerable side pane.

A generic motor vehicle door of this type is known for example from published, non-prosecuted German patent application DE 37 18 876 A1. In the motor vehicle door, the fixed triangular window is connected, above a door sill, only to a vertically running retaining web, with a U-shaped profiled retaining web engaging around a rear edge of the triangular window. To obtain a higher degree of stiffness of the connection between the retaining web and the fixed window, the latter is extended downward beyond the door sill and projects with a region in a door body. The inward-projecting region extends over a significant part of the height of that section of the retaining web which runs within the door body.

Published, non-prosecuted German patent DE 103 44 707 A1 discloses a further motor vehicle door which has a mirror connection strut and also a mirror holding region and a rim edge reinforcement region. Here, the mirror holding region is arranged in the region of a mirror triangle of the motor vehicle door. By the integration and connection of corresponding reinforcement elements, it is sought here to reduce the number of parts while simultaneously optimizing the stiffness of the overall connection.

U.S. Pat. No. 4,924,630 and JP-A-2001 097120 disclose further motor vehicle doors.

SUMMARY OF THE INVENTION

It is accordingly an object of the invention to provide a motor vehicle door, which overcomes the above-mentioned disadvantages of the prior art devices of this general type, which is an improved or at least is a different embodiment and which is characterized in particular by an increased level of stiffness.

With the foregoing and other objects in view there is provided, in accordance with the invention, a motor vehicle door. The door contains a triangular pane, a lowerable side pane, a window frame, an inner window slot, a mirror reinforcement, and a guide rail for guiding the lowerable side pane being provided between the triangular pane and the lowerable side pane. The guide rail is fixedly connected to the window frame, to the inner window slot and to the mirror reinforcement.

The invention is based on the general concept, in a motor vehicle door having a fixed triangular pane and a lowerable side pane, of an interposed guide rail for guiding the lowerable side pane being fixedly connected, in particular fixedly screwed, at its upper end to a window frame and at the bottom both to an inner window slot and also to a mirror reinforcement. As a result of the guide rail being connected at two points below a sill, it is possible to obtain considerable stiffening of the motor vehicle door, with it being possible for the two lower connecting regions below the sill of the motor vehicle door to be realized in a structurally simple and cost-effective manner. The connection both to the inner window slot and also to the mirror reinforcement offers the advantage of connecting the guide rail to two already inherently relatively stiff elements, and thereby producing a connection which stiffens the entire motor vehicle door, which connection is additionally stiffened by virtue of the guide rail being fixedly connected at its upper end region to a window frame of the vehicle door. In contrast to merely a single connection of the guide rail below the sill, it is possible with the double connection to obtain a hitherto unobtainable degree of stiffness, which in particular ensures less wind noise at high speeds. At the same time, it is possible in this way to obtain a slimmer configuration of the window frame overall, and a comparatively low weight while maintaining a similar degree of frame stiffness.

In one advantageous refinement of the solution according to the invention, the guide rail is screwed to the window frame, to the inner window slot and to the mirror reinforcement. Here, the screw connection offers the great advantage over a joining process, for example welding, that the screw connection constitutes a releasable fastening, which permits more cost-effective repairs in particular in the event of accidents.

In a further advantageous embodiment of the solution according to the invention, the guide rail is formed as a so-called sheet-metal molded part. Sheet-metal molded parts of this type can on the one hand be produced in a cost-effective manner and, on the other hand, have a high level of bending stiffness on account of their relatively high section moduli, which high level of bending stiffness likewise contributes to an increase in the stiffness of the motor vehicle door. Furthermore, sheet-metal molded parts of this type can be produced cost-effectively and with a comparatively low weight.

It is self-evident that the features specified above and the features yet to be explained below can be used not only in the respectively specified combination but rather also in other combinations or individually without departing from the scope of the present invention.

Other features which are considered as characteristic for the invention are set forth in the appended claims.

Although the invention is illustrated and described herein as embodied in a motor vehicle door, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Preferred exemplary embodiments of the invention are illustrated in the drawings and are explained in more detail in the following description, with identical reference symbols denoting identical or similar or functionally identical components.

DETAILED DESCRIPTION OF THE INVENTION

Figure 1:
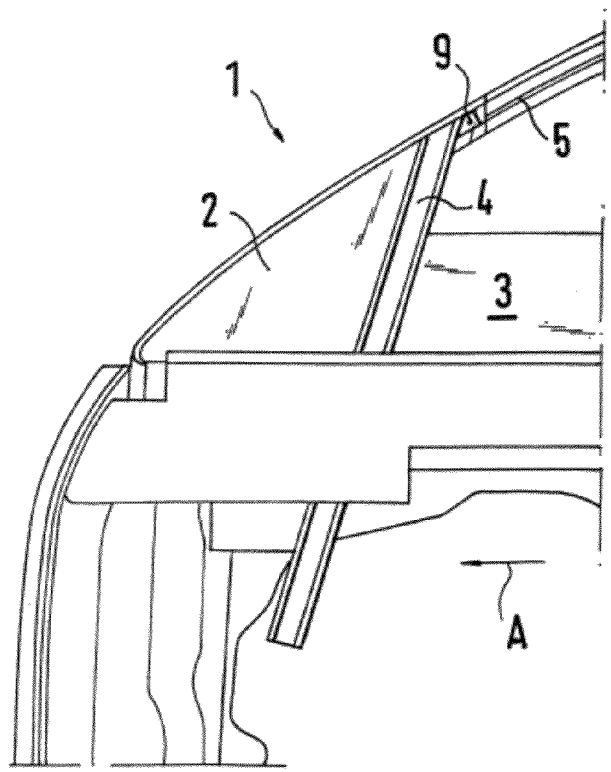
FIG. 1 is a diagrammatic, sectional view of a motor vehicle door according to the invention.
Figure 5:
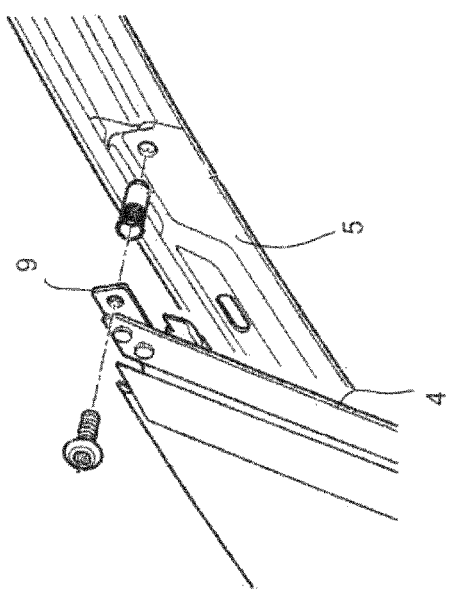
FIG. 5 is a diagrammatic, perspective view of the guide rail connected to the window frame.

Referring now to the figures of the drawing in detail and first, particularly, to FIG. 1 thereof, there is shown a motor vehicle door 1 according to the invention that has a fixed triangular pane 2 and an adjoining lowerable side pane 3. Here, the triangular pane 2 is usually arranged in front of the lowerable side pane 3 in the direction of travel, and in the illustrated example, is transparent. It is of course also conceivable here for the triangular pane 2 to also be a non-transparent plastic triangle. Here, a guide rail 4 for guiding the lowerable side pane 3 is provided between the triangular pane 2 and the lowerable side pane 3, which guide rail 4 is fixedly connected, in particular fixedly screwed, to a window frame 5 (see FIG. 5), to an inner window support or slot 6 (see FIG. 2) and to a mirror reinforcement 7 (see likewise FIG. 2). Accordingly, the guide rail 4 is fixed to the motor vehicle door 1 at two or three fixed points, as a result of which a particularly high degree of stiffening of the motor vehicle door 1 can be obtained.

Here, the guide rail 4 is arranged substantially vertically, though may also be slightly inclined, in particular slightly inclined counter to a direction of travel of the motor vehicle, as shown by way of example in FIG. 1. Here, the direction of travel of the motor vehicle is likewise denoted by the arrow A.

Figure 2:
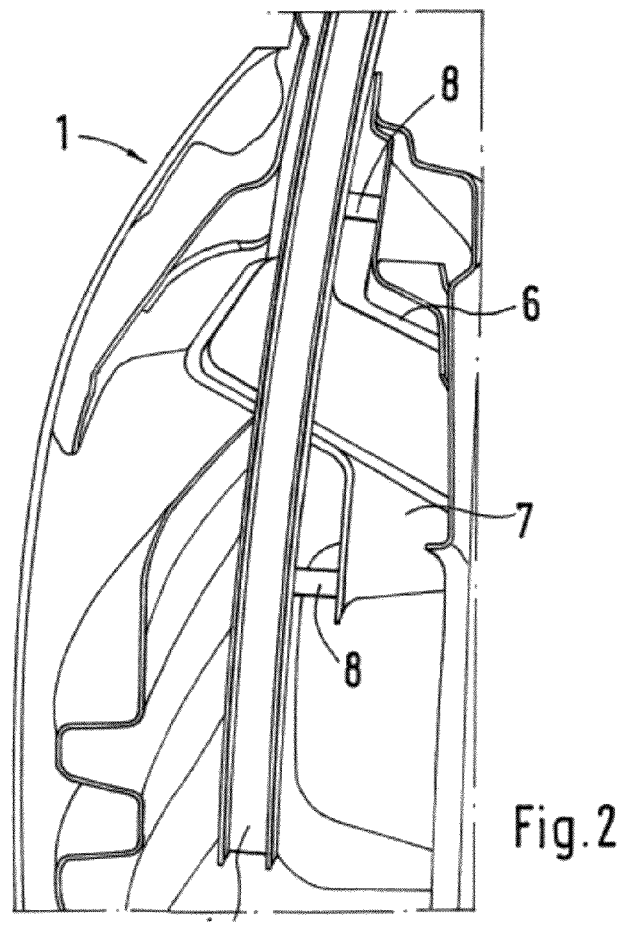
FIG. 2 is a sectional view of the motor vehicle door as per FIG. 1 from direction A.
Figure 3:
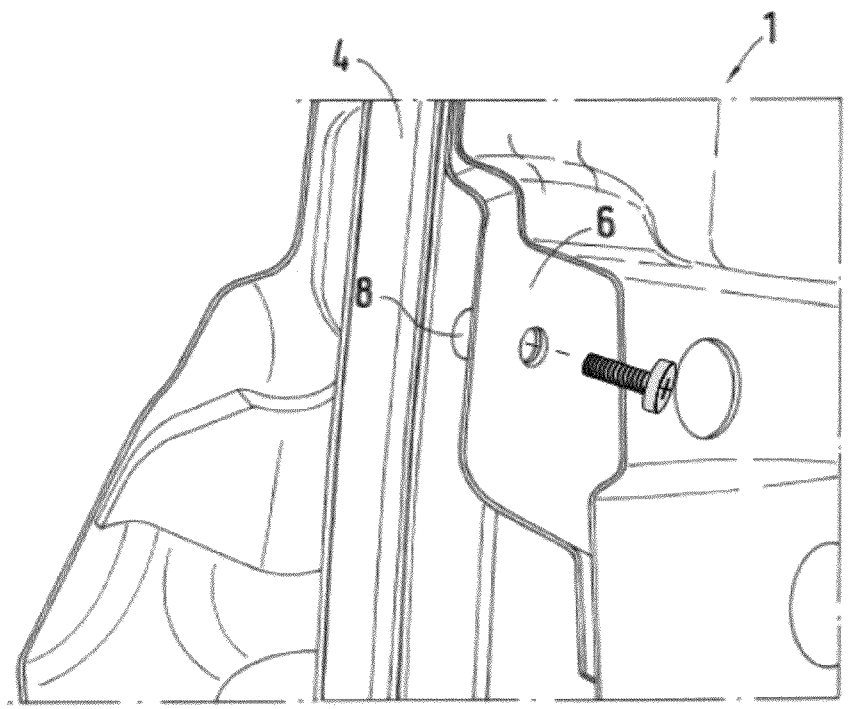
FIG. 3 is a diagrammatic, perspective view of a connection of a guide rail to an inner window slot.
Figure 4:
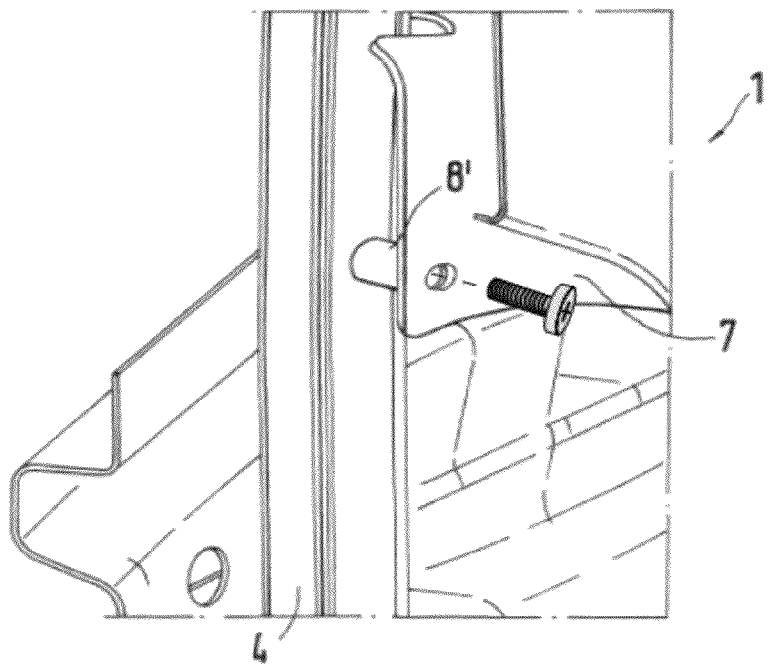
FIG. 4 is a diagrammatic, perspective view of a connection of the guide rail to a mirror reinforcement.

FIGS. 2 to 4 illustrate in detail the individual connecting points, in particular the connecting points to the inner window slot 6 and to the mirror reinforcement 7. Here, it can be seen in FIGS. 2 to 4 that the guide rail 4 is connected to the inner window slot 6 and to the mirror reinforcement 7 by in each case one respective adapter piece 8, 8', that is to say indirectly. The adapter piece 8, 8' of the type may for example serve to align the guide rail 4 in order to adjust a relative position of the guide rail 4 with respect to the inner window slot 6 and/or with respect to the mirror reinforcement 7. Here, in the simplest case, the adapter piece 8, 8' is configured as a sleeve through which the fastening device, for example the screw, extends.

In general, the guide rail 4 may be formed as a cost-effective sheet-metal molded part, as a result of which it is possible to realize a high degree of stiffness with a simultaneously low weight. Alternatively, the guide rail 4 may also be formed as an extruded profile, in particular as an extruded profile composed of light metal, as a result of which it is likewise possible to realize a weight saving, which is highly advantageous in particular in sportscar engineering.

Looking at FIG. 1, it can be seen that the guide rail 4 is connected to the window frame 5 from the outside, in particular connected to the window frame 5 by a correspondingly formed or integrally formed flange 9. Here, the flange 9 may for example run parallel to the window frame 5, and thereby provide positively locking (form locking) contact with respect to the window frame 5. A form-locking connection is one that connects two elements together due to the shape of the elements themselves, as opposed to a force-locking connection, which locks the elements together by force external to the elements.

With the guide rail according to the invention, which is connected at a total of three points, specifically to the window frame 5, to the inner window slot 6 and to the mirror reinforcement 7, it is possible for the motor vehicle door 1 to be of considerably stiffer overall design, which can be positively perceived in particular in the event of the wind noises which occur at high speeds. At the same time, the connection according to the invention of the guide rail 4 to the motor vehicle door 1 permits a slimmer configuration of the window frame 5 and also a lower weight, while simultaneously maintaining a similar degree of frame stiffness. With the guide rail 4 which is connected according to the invention, it is therefore possible to obtain several advantages without it being necessary for this purpose to accept cost or design disadvantages.

The invention claimed is:

1. A motor vehicle door, comprising:
   a triangular pane;
   a window sill;
   a lowerable side pane;
   a window frame;
   an inner window support;
   an adapter piece formed as a sleeve;
   a mirror reinforcement; and
   a guide rail for guiding said lowerable side pane being provided between said triangular pane and said lowerable side pane, said guide rail having an upper end with a flange running parallel to said window frame and by means of said flange, said guide rail connected from an exterior side to said window frame and screwed to said window frame, said guide rail fixedly connected via a screw below said window sill to said inner window support and to said mirror reinforcement via said adapter piece.

2. The motor vehicle door according to claim 1, wherein said guide rail is slightly inclined.

3. The motor vehicle door according to claim 1, wherein said guide rail is formed as a sheet-metal molded part.

4. The motor vehicle door according to claim 1, wherein said guide rail is formed as an extruded profile, composed of a metal.

5. The motor vehicle door according to claim 1, wherein said guide rail is slightly inclined counter to a direction of travel of the motor vehicle.

6. The motor vehicle door according to claim 1, wherein said flange runs parallel to said window frame.

7. A motor vehicle, comprising:
   a motor vehicle door having a motor vehicle door, said motor vehicle door containing:
   a triangular pane;
   a window sill;
   a lowerable side pane;
   a window frame;
   an inner window support;
   an adapter piece formed as a sleeve;
   a mirror reinforcement; and
   a guide rail for guiding said lowerable side pane being provided between said triangular pane and said lowerable side pane, said guide rail having an upper end with a flange running parallel to said window frame and by means of said flange, said guide rail connected from an exterior side to said window frame and screwed to said window frame, said guide rail fixedly connected via a screw below said window sill to said inner window support and to said mirror reinforcement via said adapter piece.

* * * * *